United States Patent [19]

Zinkel et al.

[11] 4,405,514

[45] Sep. 20, 1983

[54] PREPARATION OF ESTERS OF RESIN ACIDS, RESINS, ROSINS, AND DERIVATIVES THEREOF

[75] Inventors: Duane F. Zinkel, Madison, Wis.; Kunio Arimoto, Takasago, Japan

[73] Assignee: The United States of America as represented by the Secretary of Agriculture, Washington, D.C.

[21] Appl. No.: 473,396

[22] Filed: Mar. 8, 1983

[51] Int. Cl.³ ........................... C09F 1/00; C09F 7/00; C09F 9/00

[52] U.S. Cl. .................................. 260/102; 260/103; 260/105

[58] Field of Search ............................. 260/103, 102

[56] References Cited

U.S. PATENT DOCUMENTS

| | | | |
|---|---|---|---|
| 1,513,802 | 11/1924 | Crane | 260/103 |
| 1,749,482 | 3/1930 | Johnston | 260/103 |
| 1,749,483 | 3/1930 | Johnston | 260/103 |
| 2,012,622 | 8/1935 | Borglin | 260/103 |
| 2,087,506 | 7/1937 | De Groote | 260/102 |
| 2,589,674 | 3/1952 | Cook et al. | 260/102 |
| 2,703,795 | 3/1955 | Carpenter | 260/103 |

OTHER PUBLICATIONS

Mills et al., Chemistry & Industry (London), Dec. 29, 1962, p. 2144.
Holmberg et al., Tetrahedron Letters, No. 27, 2303–2306, (1975).

Primary Examiner—H. S. Cockeram
Attorney, Agent, or Firm—M. Howard Silverstein; David G. McConnell

[57] ABSTRACT

There is disclosed a process for esterifying resin acids and rosins by reacting quaternary ammonium salts thereof with an alkyl or alkenyl polyhalide for about 2 to 6 hours at temperatures between about 20° C. and 90° C. There is also disclosed novel di-esters produced by the process and the use of the process to reduce the acid number of incompletely esterified carboxylic acid components of rosins and resin acids.

16 Claims, No Drawings

PREPARATION OF ESTERS OF RESIN ACIDS, RESINS, ROSINS, AND DERIVATIVES THEREOF

BACKGROUND OF THE INVENTION

1. Field of the Invention

This invention relates to a process of preparing esters of sterically hindered resin acids, rosins, resins, and derivatives containing them by reacting a quaternary ammonium salt thereof with an alkyl or alkenyl polyhalide.

2. Description of Prior Art

Esterification of resin acids, rosins, resins, and derivatives containing them is difficult because of the steric hindrance of the diterpene acids and derivatives contained therein, e.g., abietic acid, isopimaric acid, pimaric acid, dehydroabietic acid and related skeletal types. Simple esters such as methyl esters can be prepared for laboratory use with expensive reagents such as diazoalkanes or dialkyl acetals of dimethylformamide under relatively mild conditions, e.g., room temperature (25° C.). However, commercial processes use other reagents and require higher temperatures. If more complex esters, i.e., those of polyhydroxy alcohols such as glycerol and pentaerythritol are made, even higher temperatures are required (about 250° C.). Present commercial processes involve esterification with alcohols and acids, using reagents that are different from those of the present invention.

Although the reaction of alkyl monohalides with alkali metal salts of carboxylic acids is possible, the reaction is of little importance commercially because of problems in solubility and reagent decomposition.

Mills et al. Chem. Ind. 2144 (1962) disclose the synthesis of esters by the reaction of lower alkyl halides and tertiary amine salts of carboxylic acids at about 150° C. For example, the reaction of methylene chlochloride with the triethyl amine salt of the monobutyl ester of phthalic acid for 12 hours gives a 72% yield. No esters of resin acids, resins, rosins, or derivatives thereof are disclosed. No quaternary ammonium salts are disclosed for use in the process.

Holmberg et al., Tetrahedron Letters, No. 27, 2303 (1975), disclose the reaction of tetrabutylammonium salts of carboxylic acids with methylene chloride taking several days to complete. The use of sterically hindered trimethylacetic acid is disclosed. There is no disclosure of resin acids, resins, rosins, or their derivatives.

Crane, U.S. Pat. No. 1,513,802, discloses a process of forming artificial resinous bodies by reacting an aromatic compound having haloalkyl substituents on the benzene ring with a resin acid in which a metal is substituted for the acid hydrogen. Typical aromatic compounds disclosed are benzyl chloride and chlor-xylene, resins disclosed are pine rosins which contain, inter alia, abietic acid. There is no disclosure of alkyl or alkenyl halides or of any reaction with a quaternary amine salt.

Johnston, U.S. Pat. Nos. 1,749,482 and 1,749,483, disclose a process of forming alkyl esters of commercial abietic acid or abietic acid as present in rosin with an alkyl halide such as ethyl chloride or bromie in the presence of an alkali for one-half hour at elevated temperatures and pressures. There is no disclosure of using a quaternary amine salt of the acid as a reactant.

Borglin, U.S. Pat. No. 2,012,622, discloses an esterification process of reacting a monohydric heterocyclic alcohol and abietic acid with heat and an optional catalyst, e.g., para-toluene sulfonic acid. There is no disclosure of the use of a quaternary amine salt.

The references disclosure certain aromatic, alkyl and heterocyclic esters of the acids in rosin, i.e., diterpene resin acids.

SUMMARY OF THE INVENTION

This invention relates to a process of forming esters of sterically hindered carboxylic acid components of natural products and novel diesters produced thereby, including mixed diesters. More particularly, the process of this invention relates to forming esters of rosins (the primary components of which are diterpene resin acids), resin acids, and the like by reacting an alkyl or alkenyl polyhalide with a quaternary ammonium salt of said sterically hindered carboxylic acid component of natural products at from about 20° C. to 90° C. in an organic solvent for about 2 to 6 hours. This invention also provides a means to reduce the acid number of commercially prepared rosin esters or rosin esters prepared by processes in which only part of the acid components are esterified.

DESCRIPTION OF PREFERRED EMBODIMENTS

The carboxylic acid components are rosin (which contains about 80% to 90% diterpene resin acids), disproportionated rosin, gum rosin, resin acids, and other sterically hindered carboxylic acid components of natural products. The identity of the acids contained in the resins and rosins is not critical to the process of this invention, but the acids must be sterically hindered. Among the acids present in rosins and resins are abietic acid, dehydroabietic acid, pimaric acid and isopimaric acid. Various forms of rosin can also be used, notably gum rosin, rosin dimer, wood rosin, tall oil rosin, and the like. Dicarboxylic resin acids or resin acid dimers can also be used. Rosins are preferred for use in this invention.

The quaternary ammonium salts useful in the process of this invention are prepared by reacting a quaternary ammonium hydroxide with the carboxylic acid component as defined above. One function of the quaternary ammonium salt is to solubilize the resin acids. Thus, any quaternary ammonium salt which performs this function and is reactive in the process is suitable for use in the process of this invention. Mixtures of such salts can also be used. Tetramethylammonium salts, used alone are unsatisfactory, but they can be used in mixtures of salts having the required properties. The identity of the quaternary ammonium hydroxide used to make the salt with the acid components is not critical so long as it results in salts which have the required properties. The suitable ammonium hydroxides are represented by the formula

$N(R)_4OH$ wherein R is alkyl or aryl; each R can be the same or different. The alkyl or alkenyl halides used in the process of this invention can be gem-polyhalides or non-gem-polyhalides. The gem-polyhalides result in gem-esters and the non-gem-polyhalides result in non-gem-esters. Suitable polyhalides are represented by the formula

$R_1(X)_n$ wherein $R_1$ is lower alkyl of 1 to 6 carbon atoms or lower alkenyl of 2 to 6 carbon atoms; X is chlorine, bromine or iodine; and n is 2 or 3, with the proviso that $R_1(X)_n$ is not chloroform, carbon tetrachloride or 1,2 dichloroethylene.

As used herein "aryl" means phenyl, benzyl or biphenyl and "alkyl" means branched or straight chain alkyl groups having, unless otherwise indicated, up to 18 carbon atoms.

Preferred quaternary ammonium hydroxides are those in which R is ethyl or butyl, i.e., tetraethylammonium hydroxide and tetrabutylammonium hydroxide.

Preferred alkyl halides are those in which $R_1$ is methyl or ethyl; X is iodine, chlorine or bromine; and n is 2 or 3, i.e., methylene chloride, methylene bromide, methylene iodide, 1,2-dichloroethane, 1,1,-dichloroethane, and 1,1,2-trichloroethylene.

The esterification process of this invention is carried out at about 20° C. to 90° C. for about 2 to 6 hours. Preferably the reaction is carried out at about 40° C. to 50° C. for from about 4 to 5 hours.

The reaction can be conducted in an inert organic solvent other than the halide reactant in excess. The solvent must be one in which the reactants and products are soluble. The preferred solvent is the halide reagent when used in a large excess.

The products of the reaction are mono- or di-esters of the carboxylic acids treated in the form of their quaternary ammonium salts. The mono-esters are the main product when a large excess of the halide is used. As the excess of alkyl halide is reduced, the mono-ester product decreases with a concomitant increase in the amount of di-ester. For example, if methylene chloride is the reactant at a concentration wherein the ratio of equivalent Cl to COO$^-$ is 2800, the product is a mixture containing about 60% monoester and about 40% di-ester, and the ratio of Cl to COO$^-$ equivalents is about 20, then the product contains about 99% di-ester and about 1% mono-ester. When a mixture of mono- and di-esters is produced, the products can, if desired, be separated by conventional means, e.g., chromatography. The ester products of this invention have a wide variety of uses, for example, in adhesives, printing inks and agricultural chemicals.

The following examples illustrate the invention.

EXAMPLE 1

A 39% aqueous solution of tetrabutylammonium hydroxide (19.2 g) was mixed with an ether solution containing 10 g of a dispropionated rosin of acid number 162. The ether and water were removed by distillation at reduced pressure. After addition of 50 ml of methylene chloride, the resultant solution was heated at 40° C. for 5 hours. The reaction was stopped by the addition of dilute sulfuric acid. The methylene chloride layer was separated and the excess methylene chloride was removed by evaporation to yield a product with an acid number of 5.1. A high yield of esters was confirmed by the carbonyl absorbtion in the infrared spectrum.

EXAMPLE 2

By using the same conditions as in Example 1, 10 g of a gum rosin having an acid number of 160 and a softening point of 78° C. was reacted with 16.8 g of a 25% aqueous solution of tetraethylammonium hydroxide, the water was removed, and the salt was reacted with 250 ml of methylene chloride for 5 hours at 40° C. The reaction product had an acid number of 12.5 and a softening point of 40° C. A high yield of esters was confirmed by the carbonyl absorption in the infrared spectrum.

EXAMPLE 3

In order to determine the speed of the reaction, the progress was monitored of the reaction of 196 mg of tetrabutylammonium dehydroabietate with 7 ml methylene chloride at reflux by sampling the reaction mixture at sequential time intervals. The product was isolated as in Example 1, methylated with diazomethane and analyzed by gas-liquid chromatography. The results are shown in Table I.

TABLE I

| Reaction time (mins.) | Unreacted DeAb salt* | Chloromethyl DeAb | Methylene Diester |
|---|---|---|---|
| 1 | 89.3% | 8.3% | 2.4% |
| 6 | 73.0 | 17.0 | 10.0 |
| 11 | 46.3 | 24.9 | 28.8 |
| 20 | 23.2 | 36.8 | 40.0 |
| 30 | 10.8 | 37.1 | 52.1 |
| 60 | 3.7 | 33.7 | 62.6 |
| 150 | 0.7 | 39.7 | 59.6 |
| 480 | 0.0 | 36.6 | 63.4 |

*DeAb is dehydroabietate; unreacted salt determined as methyl ester

The Table shows that the reaction was essentially complete within an hour. Note that dehydroabietic acid is only one of the carboxylic acid components of resin acids; it is used herein for convenience to illustrate the process of this invention.

EXAMPLE 4

The tetraethylammonium salts of resin acids of rosin were prepared using 10 g of gum rosin (a typical acid number is 165–170) and 16.8 g of tetraethylammonium hydroxide solution as in Example 2. The salts were reacted with 50 ml 1,1,2-trichloroethylene at 88° C. for 5 hours. The reaction product, recovered as in Example 1, had an acid number of 90.7 and a softening point of 54° C.

EXAMPLE 5

The tetrabutylammonium salt of the acids in 10 g of a rosin dimer (Sylvatac #140) with an acid number of 149 and a softening point of 139° C. was prepared by reacting the dimer with 17.6 g of a 39% aqueous solution of tetrabutylammonium hydroxide as in Example 1. The salt was dissolved in 50 ml of methylene chloride and heated at 40° C. for 5 hours. The reaction product, isolated as in Example 1, had an acid number of 20.6 and a softening point of 130° C. A high yield of esters was confirmed by the carbonyl absorption in the infrared spectrum.

EXAMPLE 6

In order to show how the composition of the ester product is controlled by changing the relative composition of the reagents, various amounts of the tetrabutylammonium salt of dehydroabietic acid were reacted at 40° C. for 5 hours with various amounts of methylene chloride and the ester product recovered as in Example 1. The esters were separated by thin-layer chromatography, then eluted with methyl-t-butyl ether and quantitatively determined by ultraviolet spectroscopy. The results are shown in Table II.

TABLE II

| mg Dehydro-abietic acid | Reactants | | Products | |
| --- | --- | --- | --- | --- |
| | ml Methylene chloride | Equiv. Cl/ Equiv. COO$^-$ | Monoester % | Diester % |
| 250 | 0.25 | 20 | 0.8 | 99.2 |
| 100 | 0.50 | 100 | 3.8 | 96.2 |
| 24 | 0.50 | 470 | 19.8 | 80.2 |
| 47 | 7.0 | 2800 | 58.9 | 41.1 |

Table II shows that as the relative amount of methylene chloride increases, the amount of monoester also increases.

EXAMPLE 7

The reactions of tetrabutylammonium dehydroabietate with methylene chloride, methylene bromide, and methylene iodide were compared at room temperature(about 25° C.). After a reaction time of 55 minutes esters were rapidly formed from methylene iodide and methylene bromide as indicated by the formation of strong carbonyl infrared absorption at 1743 cm$^{-1}$ and 1748 cm$^{-1}$, respectively. The reactions with methylene iodide and methylene bromide are considerably more rapid than those with methylene chloride as indicated by the lower intensity of the carbonyl infrared absorption band(at about 1750 cm$^{-1}$) for the latter.

EXAMPLE 8

The tetrabutylammonium salt of dehydroabietic acid was prepared following the procedure of Example 1, using 200 mg of dehydroabietic acid and 902 mg of 19% aqueous solution of tetrabutylammonium hydroxide. The solution of this salt in 7 ml 1,2-dichloroethane was heated at 40° C. for 5 hours. The reaction product was recovered following the procedures of Example 1, then separated by thin layer chromatography, and shown to be almost entirely the betachloroethyl ester, molecular weight 363(mass spec.); nuclear magnetic resonance spectra had the chemical shifts δ at 3.6(2H,t) and 4.3(2H,m); IR (C=0) at 1732 cm$^{-1}$.

EXAMPLE 9

A rosin pentaerythritol ester (5 g Sylvatac 100 N) having acid number 12 and a softening point of 101° C., was treated with 1.46 g of 19% aqueous tetrabutylammonium hydroxide. After removal of solvents, 25 ml of methylene chloride was added, and the mixture was heated at 40° C. for 5 hours. The reaction product, recovered following the procedures of Example 1, had an acid number of 1 and a softening point of 98° C.

What is claimed is:

1. A process for preparing esters of sterically hindered carboxylic acid components of rosins or resin acids comprising the steps of (a) reacting at a temperature of between about 20° C. to 90° C. for about 2 to 6 hours a quaternary amine salt of said carboxylic acid components with an alkyl or alkenyl halide wherein the amine salt is derived from a quaternary ammonium hydroxide represented by the formula N(R)$_4$OH wherein R is alkyl or aryl and each R can be the same or different and wherein the alkyl or alkenyl halide is represented by the formula R$_1$(X)$_n$ wherein R$_1$ is lower alkyl of from 1 to 6 carbon atoms or lower alkenyl of from 2 to 6 carbon atoms; X is chlorine, bromine or iodine and n is 2 or 3, with the proviso that R$_1$(X)$_n$ is not chloroform, carbon tetrachloride or 1,2-dichloroethylene, and (b) recovering the resulting esterified product.

2. The process of claim 1 wherein the carboxylic acid reactant is rosin.

3. The process of claim 1 wherein the carboxylic acid reactant is a resin acid.

4. The process of claim 1 wherein the quaternary amine salt is selected from tetraethylammonium and tetrabutylammonium.

5. The process of claim 1 wherein the halide reactant is selected from methylene chloride, methylene bromide, methylene iodide, 1,2-dichloroethane, 1,1-dichloroethane and 1,1,2-trichloroethane.

6. The process of claim 1 wherein the reaction time is about 4 to 5 hours and the reaction temperature is about 40° C. to 50° C.

7. The process of claim 1 wherein the weight ratio of the acid reagent to the halide reagent is from about 1000:1 to about 6.7:1.

8. The process of claim 7 wherein the reaction is carried out for about 5 hours at about 40° C.

9. The process of claim 1 wherein the ratio of equivalent Cl to equivalent COO$^-$ is about 2800:1.

10. The process of claim 1 wherein the ratio of equivalent Cl to equivalent COO$^-$ is about 20:1.

11. The process of claim 1 wherein said halide is a gem-halide and the product is a gem-di-ester.

12. The process of claim 1 wherein said halide is a non-gem-halide and the product is a non-gem-di-ester.

13. The process of claim 9 wherein the product is a mono-ester.

14. The process of claim 10 wherein the product is a di-ester.

15. A di-ester prepared according to the process of claim 10.

16. A process of reducing the acid number of incompletely esterified carboxylic acid components of rosins or resin acids comprising the steps of reacting at a temperature of between about 20° C. and 90° C. for about 2 to 6 hours a quaternary ammonium salt of said incompletely esterified rosins or resin acids with an alkyl or alkenyl halide wherein the quaternary ammonium salt is derived from a quaternary ammonium hydroxide represented by the formula N(R)$_4$OH wherein R is alkyl or aryl and each R can be the same or different and wherein the alkyl or alkenyl halide is represented by the formula R$_1$(X)$_n$ wherein R$_1$ is lower alkyl of from 1 to 6 carbon atoms or lower alkenyl of from 2 to 6 carbon atoms; X is chlorine, bromine or iodine; and n is 2 or 3; with the proviso that R$_1$(X)$_n$ is not chloroform, carbon tetrachloride or 1,2-dichloroethylene; and recovering the resulting esterified product.

* * * * *